United States Patent [19]

Narita

[11] Patent Number: 5,007,308

[45] Date of Patent: Apr. 16, 1991

[54] LINE PRESSURE CONTROL FOR AUTOMATIC TRANSMISSION

[75] Inventor: Yasushi Narita, Yokohama, Japan

[73] Assignee: Nissan Motor Co., Ltd., Yokohama, Japan

[21] Appl. No.: 382,120

[22] Filed: Jul. 19, 1989

[30] Foreign Application Priority Data

Jul. 19, 1988 [JP] Japan ................. 63-178057
Aug. 2, 1988 [JP] Japan ................. 63-192010
Aug. 23, 1988 [JP] Japan ................. 63-207369

[51] Int. Cl.$^5$ .............................. B60K 41/18
[52] U.S. Cl. .............................. 74/866; 74/867
[58] Field of Search .......................... 74/867, 866

[56] References Cited

U.S. PATENT DOCUMENTS

| | | | |
|---|---|---|---|
| 4,283,970 | 8/1981 | Vukovich | 74/866 |
| 4,488,456 | 12/1984 | Taga et al. | 74/867 X |
| 4,653,350 | 3/1987 | Downs et al. | 74/864 |
| 4,680,992 | 7/1987 | Hayasaki et al. | 74/869 |
| 4,742,461 | 5/1988 | Eschrich et al. | 364/424.1 |
| 4,781,080 | 11/1988 | Iwatsuki | 74/867 |
| 4,846,021 | 7/1989 | Hamano et al. | 74/867 X |
| 4,882,952 | 11/1989 | Kashihara et al. | 74/867 |

FOREIGN PATENT DOCUMENTS 60-260749 12/1985 Japan .

OTHER PUBLICATIONS

Nissan Full-Range Automatic Transmission RE4R01A Type, Service Manual, 1987.

Primary Examiner—Dirk Wright
Attorney, Agent, or Firm—Foley & Lardner

[57] ABSTRACT

A line pressure control during a shifting operation of an automatic transmission is disclosed. Quality of each shifting operation is represented by a predetermined variable, viz, an inertia phase time during which a gear ratio undergoes a variation. When a deviation between circumstances detected upon occurrence of a shifting operation and predetermined circumstances under which a target value is set fails to fall in a predetermined range, a deviation indicative signal is generated. Upon absence of this deviation indicative signal after completion of the shifting operation, the inertia phase time measured during the shifting operation is compared with the target value and the line pressure is adjusted in response to this comparison result when the shifting operation of the same kind is to occur under substantially the same circumstances detected. In other words, the learning to adjust the line pressure is prohibited when the deviation indicative signal is present.

14 Claims, 10 Drawing Sheets

LINE PRESSURE CONTROL FOR AUTOMATIC TRANSMISSION

RELATED APPLICATIONS

U.S. patent application Ser. No. 07/289,050 filed on Dec. 23, 1988 by Hiroshi YAMAGUCHI now U.S. Pat. No. 4,981,053.

U.S. patent application Ser. No. 07/306,606 filed on Feb. 6, 1989 by Akihiko SANO now allowed:

BACKGROUND OF THE INVENTION

The present invention relates to a line pressure control for an automatic transmission.

In automatic transmissions, a desired one of gear positions is established by delivering hydraulic fluid to selected one or ones of various friction elements (such as clutches and brakes) to hydraulically activate same, and a shift between two gear positions is effected by changing the friction element or elements to be activated. If the line pressure is excessively high, a capacity of a friction element which reveals during a shifting operation becomes excessively high, causing a great shock to occur, whereas if the line pressure is excessively low, the capacity of the friction element becomes excessively low, causing a slip to occur, thus shortening an operating life of the friction element. Thus, the line pressure has to be appropriately adjusted.

Well known is an automatic transmission which is described in the publication entitled "SERVICE MANUAL FOR AUTOMATIC TRANSMISSION OF THE RE4R01A TYPE" (A261C07) published in March 1987 by NISSAN MOTOR COMPANY, LIMITED. In this known automatic transmission, a line pressure solenoid of the duty cycle type is arranged to close or open a drain circuit of a pilot pressure to regulate a throttle pressure delivered to a pressure modifier valve where the throttle pressure is converted into a pressure modifier pressure. This pressure modifier pressure is applied to a regulator valve which generates a line pressure. The magnitude of the line pressure is controlled by varying a proportion of OFF time period to one cycle time period of a drive current which the line pressure solenoid is operated on. Since a needle valve closes the drain circuit when the line pressure solenoid is OFF while it opens the drain circuit when the line pressure solenoid is ON, the magnitude of the throttle pressure increases as the proportion of OFF time period increases. Thus, increasing the proportion of OFF time period causes the line pressure regulator to increase the magnitude of the line pressure. Various values of the proportion of OFF time period are contained in a table data in a ROM of a microcomputer of an automatic transmission control unit. Different table data are provided, one for use during a shifting operation, another for ordinary non-shifting operation, for example. These values are arranged in each table data as being retrievable by table look-up operation using a variable such as a throttle opening degree. In the present application, the term "duty" is hereinafter used to mean the proportion of OFF time period to the cycle time period and expressed in terms of percentage (%).

However, this line pressure control used in the known automatic transmission is not satisfactory in that it cannot cope with a situation where the line pressure solenoid has a manufacturing variation or the characteristic of the line pressure solenoid degrades with time or a situation where the friction element has a manufacturing variation or the frictional material of the friction element degrades with time. In the former situation, even if the line pressure solenoid is subject to the same duty, the magnitude of line pressure deviates from a target value. In the latter situation, even if the magnitude of line pressure is adjusted to the target value, the friction element does not show a desired performance characteristic. Thus, in any event, the conventional line pressure control system fails to avoid occurrence of substantial shift shock or reduction in operating life of the friction element.

In order to cope with this problem, it has been proposed to adjust the magnitude of line pressure for the next occurrence of a shifting operation as a result of learning of the present occurrence of the shifting operation as noted in U.S. patent application Ser. No. 07/289,050 or European patent application No. 88 121 587.5. According to this proposal, the shifting operation is evaluated by monitoring the inertia phase time when a gear ratio varies from one gear ratio for one gear position to another gear ratio for another gear position since the inertia phase time varies with variation in magnitude of line pressure delivered to the shifting friction element during the shifting operation. Specifically, the inertia phase time when the gear ratio, viz., a ratio of a revolution speed of a transmission input shaft (a turbine shaft) to a revolution speed of a transmission output shaft, is subject to variation is compared with a target value, and the magnitude of the line pressure for the next occurrence of the same shifting operation is varied in accordance with the result of the comparison. The target value which the inertia phase time is compared with is obtained by a table look-up operation of a data table suitable for a shifting operation conducted. This data table contains a plurality of values for shifting operations of the same kind but with different throttle opening degrees, respectively. These values in this data table are true when the automatic transmission conducts the shifting operation under predetermined circumstances. This means that they cannot be relied upon for learning when the automatic transmission conducts the shifting operation not under the predetermined conditions, causing a potential problem that the line pressure is adjusted in a wrong manner.

An object of the present invention is to improve a line pressure control of the above-mentioned type such that the potential problem mentioned above is eliminated.

SUMMARY OF THE INVENTION

According to the present invention, there is provided a line pressure control system for an automatic transmission when the automatic transmission undergoes a shifting operation of one kind where the line pressure is used to activate a friction element, the line pressure control system, comprising:

means for storing a target value of a predetermined variable that is representative of a quality of the shifting operation of the same kind which occurred under predetermined circumstances, means for determining an actual value of the predetermined variable for the shifting operation after the occurrence of the shifting operation and generating an actual value indicative signal indicative of the actual value measured;

means for detecting circumstances surrounding the occurrence of the shifting operation;

means for comparing the circumstances detected with the predetermined circumstances and generating a deviation indicative signal when a deviation therebetween fails to fall in a predetermined range;

means for comparing the actual value indicative signal with the target value when the deviation indicative signal is absent and generating a comparison result signal indicative of a difference between the actual value measured and the target value, and means for adjusting the magnitude of the line pressure in response to the comparison result indicative signal during the next occurrence of the shifting operation in such a direction as to decrease the difference indicated by the comparison result indicative signal, whereby the friction element is activated by the line pressure adjusted during the next occurrence of the shifting operation.

According to another aspect of the present invention, there is provided a line pressure control method for an automatic transmission when the automatic transmission undergoes a shifting operation of one kind where the line pressure is used to activate a friction element, the line pressure control method comprising the steps of;

setting a target value of a predetermined variable that is representative of the shifting operation occurring under predetermined circumstances, determining an actual value of the predetermined variable for the shifting operation after the occurrence of the shifting operation and generating an actual value indicative signal indicative of the actual value measured;

detecting circumstances surrounding the occurrence of the shifting operation;

comparing the circumstances detected with the predetermined circumstances and generating a deviation indicative signal when a deviation therebetween fails to fall in a predetermined range;

comparing the actual value measured with the target value when the deviation indicative signal is absent and generating a comparison result indicative signal indicative of the result of comparing the actual value detected with the target value; and adjusting the magnitude of the line pressure in response to the comparison result indicative signal during the next occurrence of the shifting operation in such a direction as to decrease the difference indicated by the comparison result indicative signal, whereby the friction element is activated by the line pressure adjusted during the next occurrence of the shifting operation.

BRIEF DESCRIPTION OF THE DRAWINGS

FIG. 7 is a chart showing in the fully drawn curves variation of total shifting time ($T_1$) required for and variation of inertia phase time ($T_2$) of a 1-2 upshifting operation taking place in accordance with a shift schedule called "economy pattern" and in the broken curves variation of total shifting time ($T_1$) required for and variation of inertia phase time ($T_2$) of the 1-2 upshifting operation taking place in accordance with another shift schedule called "power pattern", the variations being plotted versus various values of duty D which a line pressure solenoid is subjected to;

DETAILED DESCRIPTION OF THE INVENTION

Figure 1:
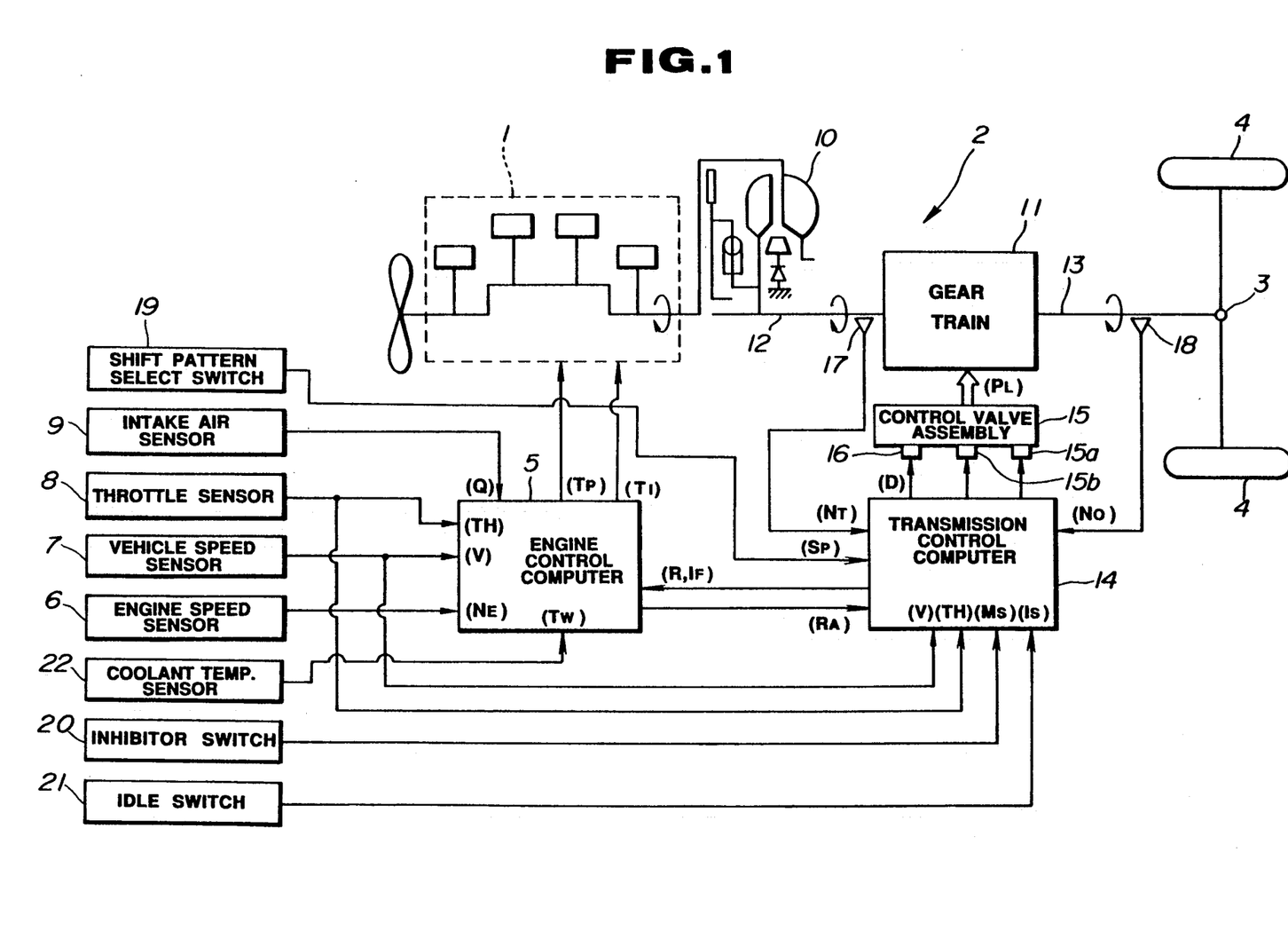
FIG. 1 is a block diagram of an automotive power train incorporating a line pressure control according to the present invention.

Referring to FIG. 1, there is shown a power train control system for an automobile incorporating a line pressure control according to the present invention. The reference numeral 1 generally denotes an electronically controlled fuel injected engine, 2 an automatic transmission, 3 a differential gear, and 4 a pair of driving wheels.

The engine 1 is operatively associated with a microcomputer based engine control unit 5 (often called also as an engine control computer). Fed to the control unit 5 are output signals of the following sensors. They include an engine revolution speed sensor 6 for detecting an engine revolution speed $N_E$ and generating an engine revolution speed indicative signal indicative of the engine revolution speed $N_E$ detected, a vehicle speed sensor 7 for detecting a vehicle speed V and generating a vehicle speed indicative of the vehicle speed V detected, a throttle sensor 8 for detecting an engine throttle opening degree TH and generating an engine throttle opening degree indicative signal indicative of the engine throttle opening degree TH detected, and an intake air amount sensor 9 for detecting an engine intake air amount Q and generating an intake air amount indicative signal indicative of the engine intake air amount Q detected. The microcomputer based control unit 5 includes as usual a CPU (central processor unit), a ROM (read only memory), a RAM (random access memory), and an input/output control unit. What are performed by this microcomputer based control unit 5 include supplying the engine 1 with a command based on a pulse width $T_P$ of a fuel injection pulse train, which pulse width is determined after computation based on input informations carried by the sensor output signals, and supplying the engine 1 with a spark timing control signal $T_I$. The latter control is not illustrated. The engine is supplied with an amount of fuel that is determined in proportion to the pulse width $T_P$ of the fuel injection pulse train, and operates on combustion of the fuel which occurs in timed relationship with the engine revolution.

The automatic transmission 2 includes a torque converter 10 and a change-speed gear train 11 arranged in tandem. The gear train 11 includes an input shaft 12 connected to a turbine runner of the torque converter 10 to receive an engine power resulting from multiplication by the torque converter 10. Input revolution of the input shaft 12 is delivered to an output shaft 13 through the gear train 11 where the revolution speed is increased or decreased. The revolution of the output shaft 13 is delivered through the differential gear 3 to the pair of driving wheels 4, causing the automobile to run.

The gear train 11 includes various kinds of friction elements (not shown), such as clutches and brakes, which are selectively engaged to establish one of the power delivery paths between the input and output shafts 12 and 13. The various friction elements are selectively and hydraulically activated by line pressure $P_L$ to establish a desired gear position, and the friction element or elements which are hydraulically activated are changed to effect a shift to another gear position from the present gear position.

For this shifting control, there is provided a microcomputer based control unit 14 (often also called a transmission control computer) and a control valve assembly 15. The microcomputer based control unit 14 energizes selected one or ones of shift solenoids 15a and 15b within the control valve assembly 15 to accomplish a desired combination of ON and OFF states of the shift solenoids 15a and 15b, delivering the line pressure $P_L$ to selected one or ones of the various kinds of friction elements to establish a gear position corresponding to the desired combination of ON and OFF states of the shift solenoids 15a and 15b. In this manner, the shift between two gear positions is effected. Another function conducted by the microcomputer based control unit 14 is to control duty D which a line pressure control solenoid 16 is subject to, thereby varying the throttle pressure which the line pressure $P_L$ is variable with. The relationship between the duty D and the magnitude of line pressure is such that the magnitude of the line pressure $P_L$ increases as the duty D increases. The control unit 14 is supplied not only with the sensor signal V of the vehicle speed sensor 7 and the sensor signal TH of the throttle sensor 8, but also with the output signal $S_P$ of a shift pattern select switch (or a power shift switch) 19, the output signal $M_S$ of an inhibitor switch 20 and the output signal $I_S$ of an idle switch 21. Also supplied to the control unit 14 are the sensor signal $N_T$ of an input revolution speed sensor 17 and the sensor signal $N_O$ of an output revolution speed sensor 18. The input revolution speed sensor 17 detects a revolution speed $N_T$ of the input shaft 12, which may be called a turbine shaft as it is drivingly connected to the turbine runner of the torque converter 10, while the output revolution speed sensor 18 detects a revolution speed $N_O$ of the output shaft 13. The shift pattern select switch 19 has an "AUTO" position and a "POWER" position. When the shift pattern select switch 19 is placed at the "AUTO" position, the "economy pattern" or the "power pattern" are selectively used in response to operating conditions and thus the automatic transmission is shiftable in accordance with the "economy pattern" or the "power pattern". When the shift pattern select switch 19 is placed at the "POWER" position, the automatic transmission is shiftable in accordance with the "power pattern" only. The inhibitor switch 20 detects which of a plurality of range positions a selector lever of a manual valve is placed at and thus the output signal is indicative of the range position selected by the selector lever. The idle switch 21 detects the full closing of the engine throttle valve and becomes ON.

The transmission 2 including the gear train 11 and the control valve assembly 15 with two shift solenoids 15a and 15b and line pressure solenoid 16 is well known and described in detail in the before mentioned publication entitled "SERVICE MANUAL FOR AUTOMATIC TRANSMISSION OF THE RE4R01A TYPE" (A261C07) published in March 1987 by NISSAN MOTOR COMPANY, LIMITED. In order to fully understood how a shifting operation is carried out by the two shift solenoids 15a and 15b and how the magnitude of line pressure is adjusted by the line pressure solenoid 16, reference should be made to U.S. Pat. No. 4,680,992, issued to Hayasaki et al. on Jul. 21, 1987, which has been herein incorporated by reference in its entirety (see shift solenoids 42 and 44, and a line pressure solenoid 24 in FIGS. 1A, 1B and 1C).

Figure 2:
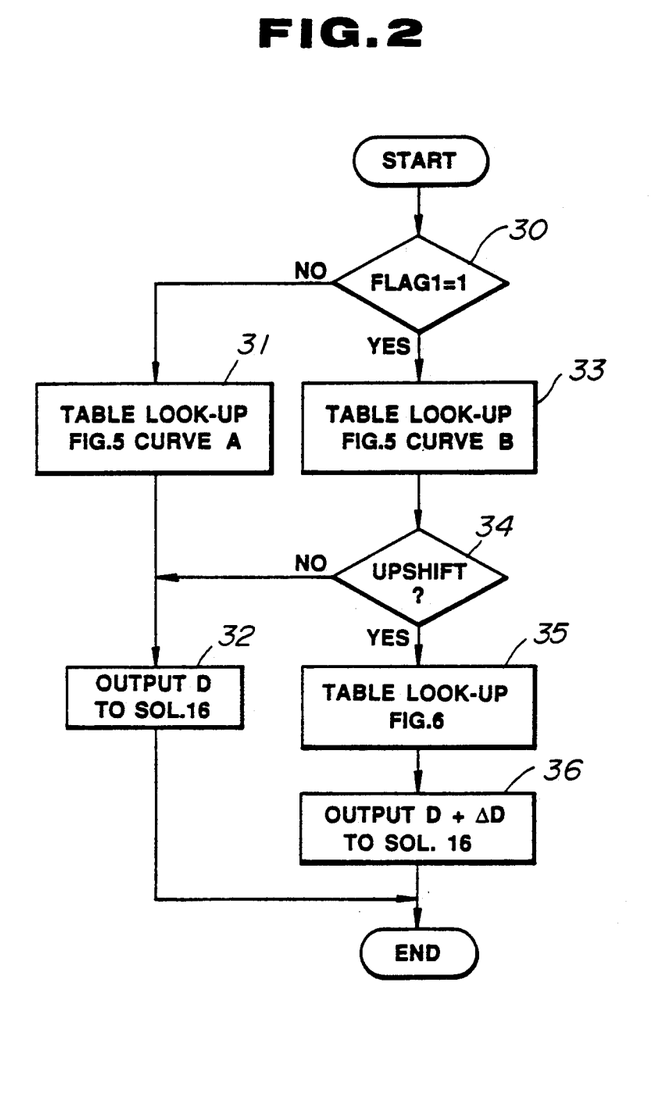
FIG. 2 is a flowchart of a program for determining the magnitude of line pressure.
Figure 3:
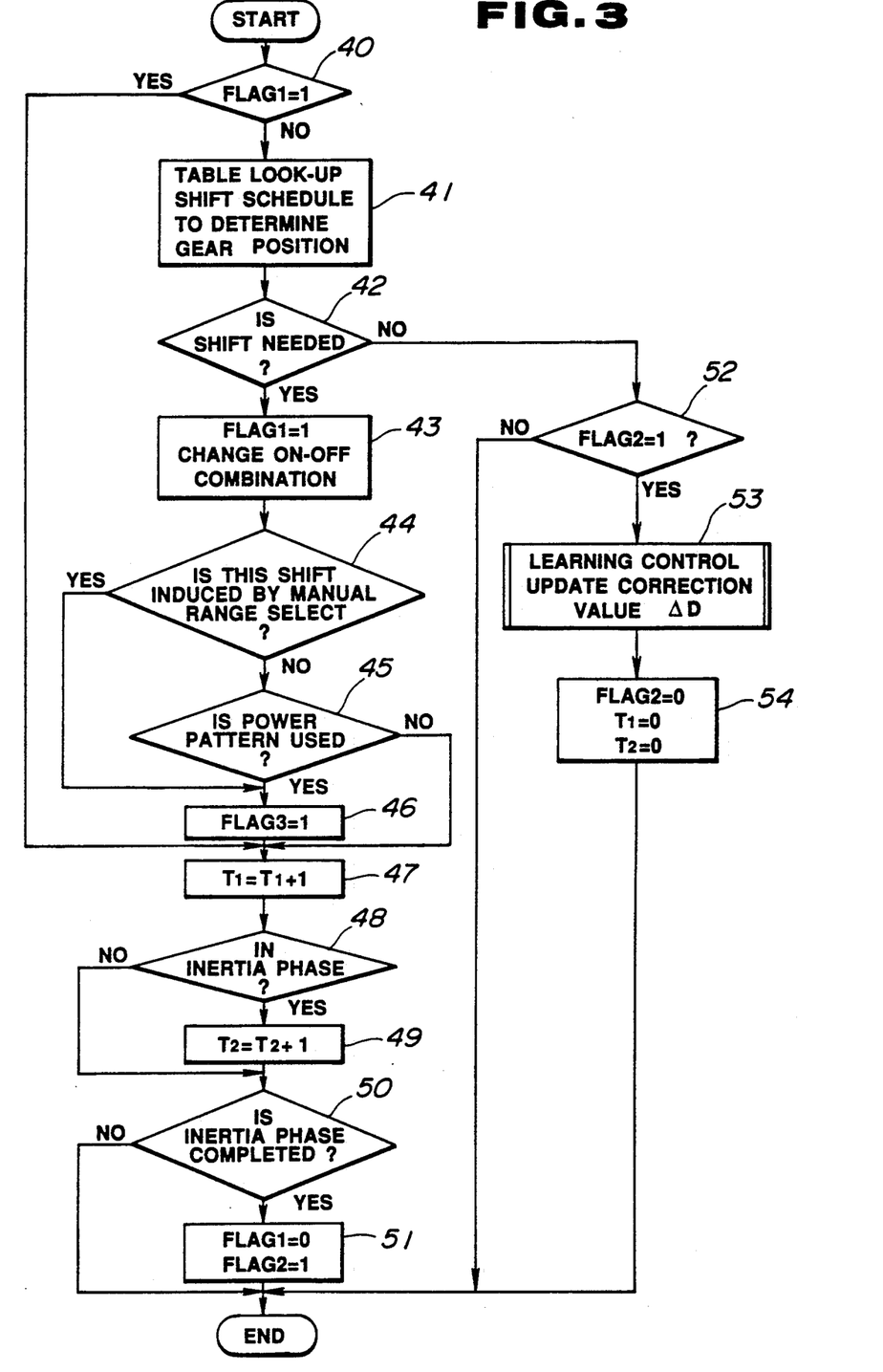
FIG. 3 is a flowchart, showing one feature of the present invention, of a program including a phase for shifting operation, a phase for detecting circumstances which the shifting operation is involved in, a phase for measuring, as a predetermined variable, an inertia phase time of the shifting operation, and a phase for initiaitng execution of a sub-program shown in FIG. 4.
Figure 4:
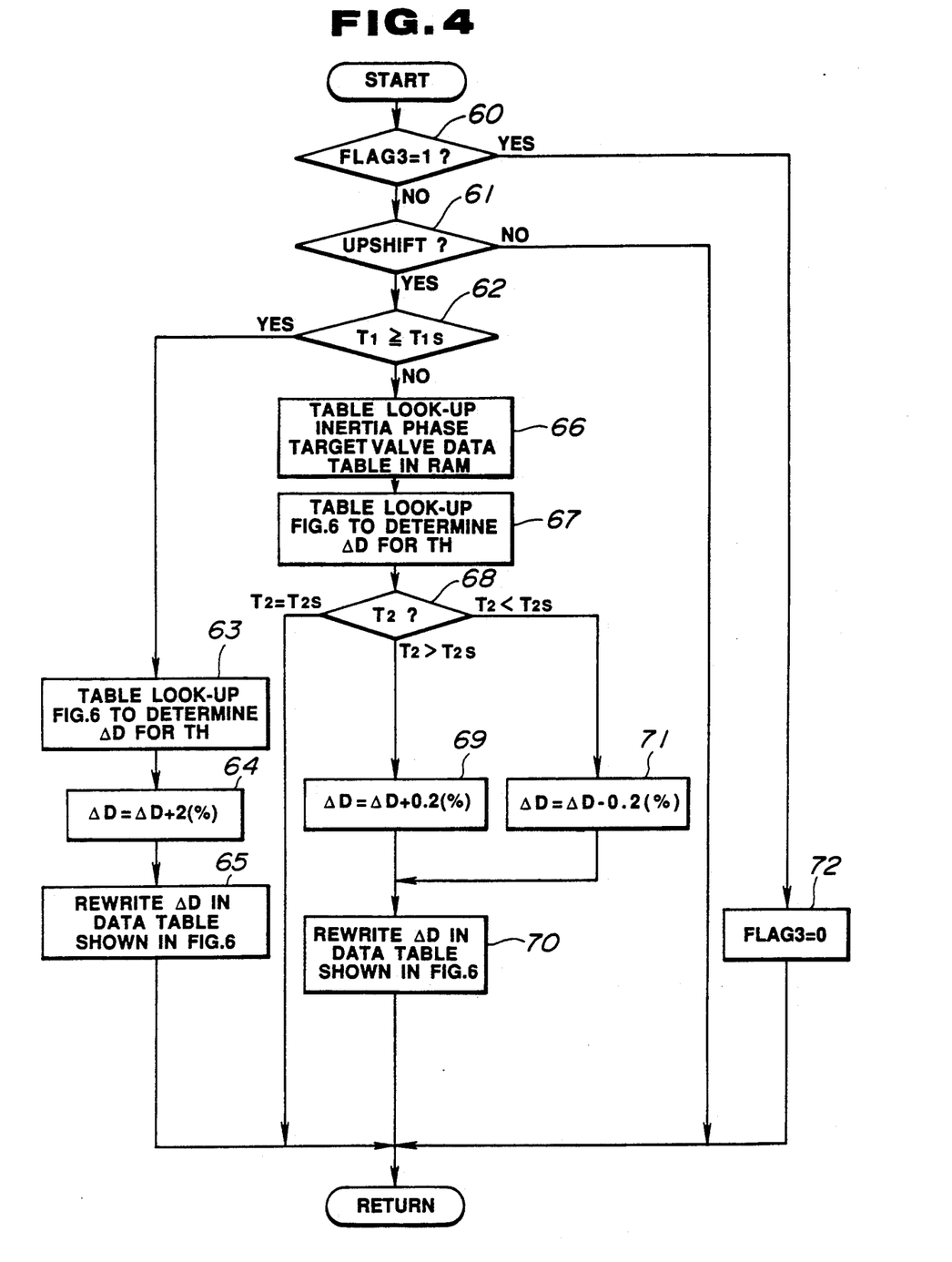
FIG. 4 is a flowchart of a sub-program including a phase for learning wherein the inertia phase time measured is compared with a target value obtained by a table look-up operation of a data table, and a correction value in a correction data table is rewritten with a new value obtained by the learning.

Referring to FIGS. 2 to 4, the above-mentioned line pressure control and shift control performed by the microcomputer based control unit 14 are explained along with flowcharts illustrated. The flowcharts illustrate control programs stored in the ROM of the microcomputer based control unit 14.

The execution of the line pressure control program as shown in FIG. 2 is initiated by a constant time interruption. At a step 30, a decision is made whether a flag FLAG1 is equal to 1 or not, thereby to determine that the gear train 11 is subject to a shifting operation when the flag FLAG1 is equal to 1 and it is not subject to the shifting operation when the flag FLAG1 is 0 (zero). As a result, if the decision made at the step 30 indicates that the transmission is not subject to the shifting operation, the program proceeds to a step 31 where the CPU performs a table look-up operation of a data table as illustrated by a characteristic curve A shown in FIG. 5 to retrieve a duty D corresponding to a throttle opening degree TH indicated by the throttle opening degree indicative signal stored by a read-in operation at the preceding step not shown. Then, the program proceeds to a step 32 where the duty D obtained at the step 31 is supplied to the line pressure solenoid 16, adjusting the line pressure $P_L$ to a value suitable for non-shifting ordinary operation of the gear train 11 when it is not subject to the shifting operation.

Figure 5:
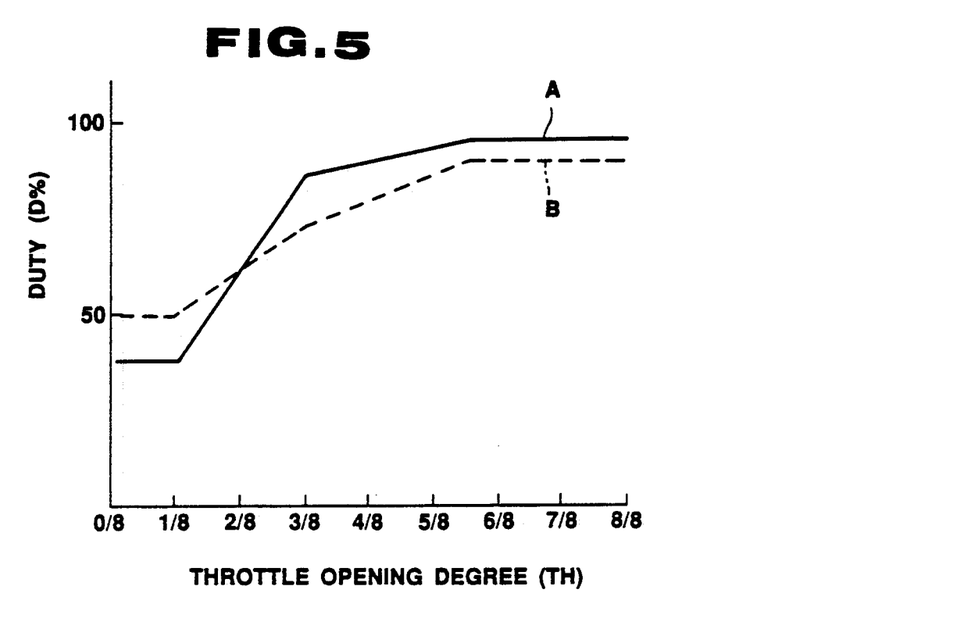
FIG. 5 is a chart showing two characteristic curves A and B which are selectively used in the flowchart shown in FIG. 2 to retrieve D (duty) for a throttle opening degree detected by a throttle sensor.
Figure 6:
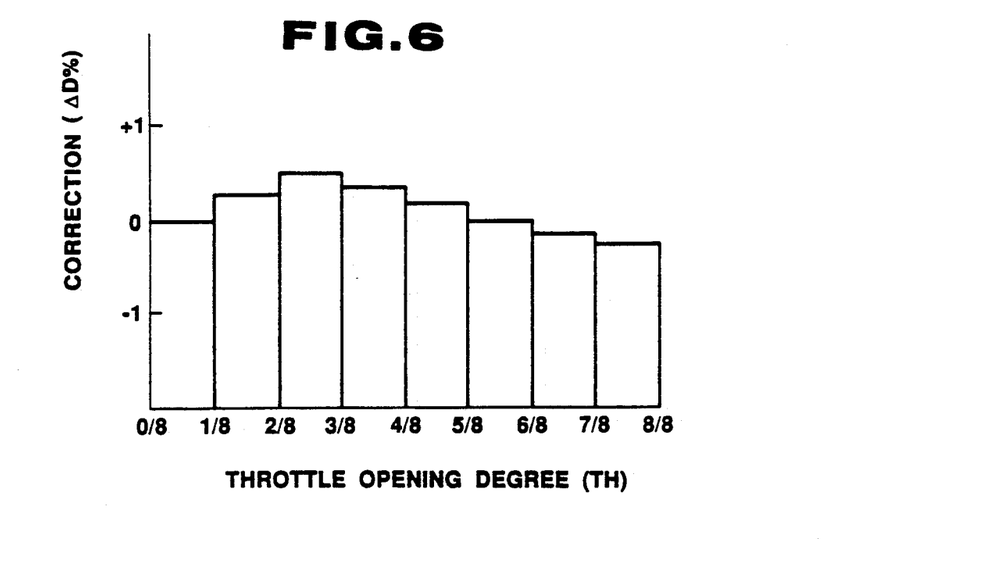
FIG. 6 is a chart illustrating duty correction values for different throttle opening degrees contained in a table data stored in a RAM.

On the other hand, if the decision made at the step 30 indicates that the gear train 11 is subject to the shifting operation, the program proceeds to a step 33 where the CPU performs a table look-up operation of a map illustrated by a characteristic curve B shown in FIG. 5 to retrieve a duty D corresponding to a throttle opening degree TH indicated by the throttle opening degree indicative signal stored by a read-in operation at the preceding step not shown. Then, the program proceeds to a step 34 where a decision is made whether the shifting operation is classified as an upshift or not. If it is not an upshift, namely it is a downshift, the program proceeds to the step 32 where the duty D obtained at the step 33 is supplied to the solenoid 16. If the decision made at the step 34 indicates that the shifting is an upshift, the program proceeds to a step 35 where the CPU performs a table look-up operation of a correction value data table as illustrated in FIG. 6 and stored in the RAM to retrieve a duty correction value ΔD (delta D) corresponding to a throttle opening degree TH indicated by the throttle opening degree indicative signal stored at the preceding read-in step mentioned before. The data of this table data is updated or rewritten with corrected data resulting from learning which will be later described. In the RAM, there are stored a plurality of such data tables provided for different kinds of shifting operations available, respectively. After executing the step 35, the program proceeds to a step 36 where the duty expressed by D+ΔD is supplied to the solenoid 16 to adjust the line pressure $P_L$ to the value suitable for the shifting operation.

FIG. 3 shows a control program for effecting a shift control and a solenoid duty correction value update control. The execution of this control program is initiated by a constant time interruption. In FIG. 3, at a step 40, it is decided whether the flag FLAG1 is equal to 1 or not. If the gear train 11 is not subject to shifting operation and thus the flag FLAG1 is not equal to 1, the program proceeds from the step 40 to a step 41. At the step 41, the CPU performs a table look-up operation of a shift schedule or pattern data table which has been selected based on a vehicle speed V and a throttle opening degree TH which have been stored as a result of the preceding read-in operations of the sensor output signals of the vehicle speed sensor 7 and the throttle sensor 8 performed at the preceding read-in steps in the same run, not shown. As a result, a desired gear position is obtained most suitable for the vehicle speed V and throttle opening degree TH.

Then, the program proceeds to a step 42 where it is decided whether a shift, namely a change in gear position, is needed or not based on whether the present gear position is the same as the desired gear position obtained at the step 41 or not. If such a shift is needed and thus the answer to the inquiry at the step 42 is YES, the program proceeds from this step 42 to a step 43. At the step 43, the flag FLAG1 is set equal to 1 and an ON-OFF combination of the shift solenoids 15a and 15b is changed to establish the desired gear position in the gear train 11. Then, the program proceeds to a step 44 where it is decided whether the present shift in gear position is induced by selection of a manual range (II range or I range) by the select lever or not. This decision is made based on the output signal of the inhibitor switch 20. If the answer to the inquiry at step 44 is YES, the program proceeds to a step 46 where a flag FLAG3 is set equal to 1. However, if the answer to the inquiry at the step 44 is NO, the program proceeds to a step 45 where it is decided whether the "power pattern" is used or not. If the answer to the inquiry at the step 45 is YES, the program proceeds to the above-mentioned step 46. If the answer to the inquiry at the step 45 is NO, the program proceeds to a step 47. Returning to the step 40, if the answer to the inquiry at this step 40 is YES, the program proceeds from the step 40 directly to the step 47 skipping the steps 41, 42, 43, 44 and 45 as long as the flag FLAG1 continues to be equal to 1.

At the step 47, an increment is made to the content of a timer $T_1$ which is provided to measure a total shifting time beginning with a shift command, namely at the instance when the flag FLAG1 is set equal to 1 at the step 43, and ending with the completion of the shift, namely the completion of the inertia phase of the shift. Thereafter, the program proceeds to a step 48 where it is decided whether or not an actual gear ratio $N_T/N_O$ falls in a predetermined range determined in view of a gear ratio of the present gear position and a gear ratio of the desired gear position determined at the step 41. In this case, it is recognized that the inertia phase proceeds when the answer to the inquiry at the step 48 is YES. If the answer to the inquiry at the step 48 is YES, the program proceeds to a step 49 where an increment is made to a timer $T_2$. If the answer to the inquiry at the step 48 is NO, the program proceeds to a step 50 bypassing the step 49. It will now be noted that the content of the timer $T_2$ represents the inertia phase time, namely, a period of time for the inertia phase.

At the subsequent step 50, it is decided whether the inertia phase is completed or not. This step is cooperating with the step 48 such that the answer to the inquiry at the step 50 becomes NO when the answer to the inquiry at the step 48 is YES, while the answer to the inquiry at the step 50 becomes YES when the answer to the inquiry at the step 48 is NO. Thus, when the inertia phase is completed, the program proceeds from the step 50 to a step 51 where the flag FLAG1 is reset to 0 (zero) and a flag FLAG2 is set equal to 1. This flag FLAG2 indicates whether the learning to update the correction value data stored in the RAM is to be executed or not.

In the subsequent run immediately after the completion of the shifting operation, the program proceeds from the step 42 to a step 52. At the step 52, it is decided whether the flag FLAG2 is set equal to 1 or not. Since, in this case, FLAG2 =1, the program proceeds from the step 52 to a step 53 where the above-mentioned learning control as illustrated by the flowchart shown in FIG. 4 is effected to update or rewrite the duty correction value ΔD (delta D) stored as illustrated in FIG. 6 in the RAM.

At the step 53, the execution of the program shown in FIG. 4 is initiated. In FIG. 4, at a step 60, it is decided whether the flag FLAG3 is equal to 1 or not. If the flag FLAG3 is not equal to 1, the program proceeds to a step 61 where it is decided whether the previous shifting operation is an upshift or not. The fact that FLAG3 is not equal to 1 indicates that the previous shifting operation took place in accordance with the "economy pattern" in the automatic drive range, viz., D range. If the previous shifting operation is not an upshift, the program ends since no learning control is intended based on upshift. However, if the answer to the inquiry at the step 61 is YES, the program proceeds to a step 62 where it is decided whether or not the content of the timer $T_1$, viz., the total shifting time, is greater than or equal to a predetermined value $T_{1S}$ or not.

Figure 7:
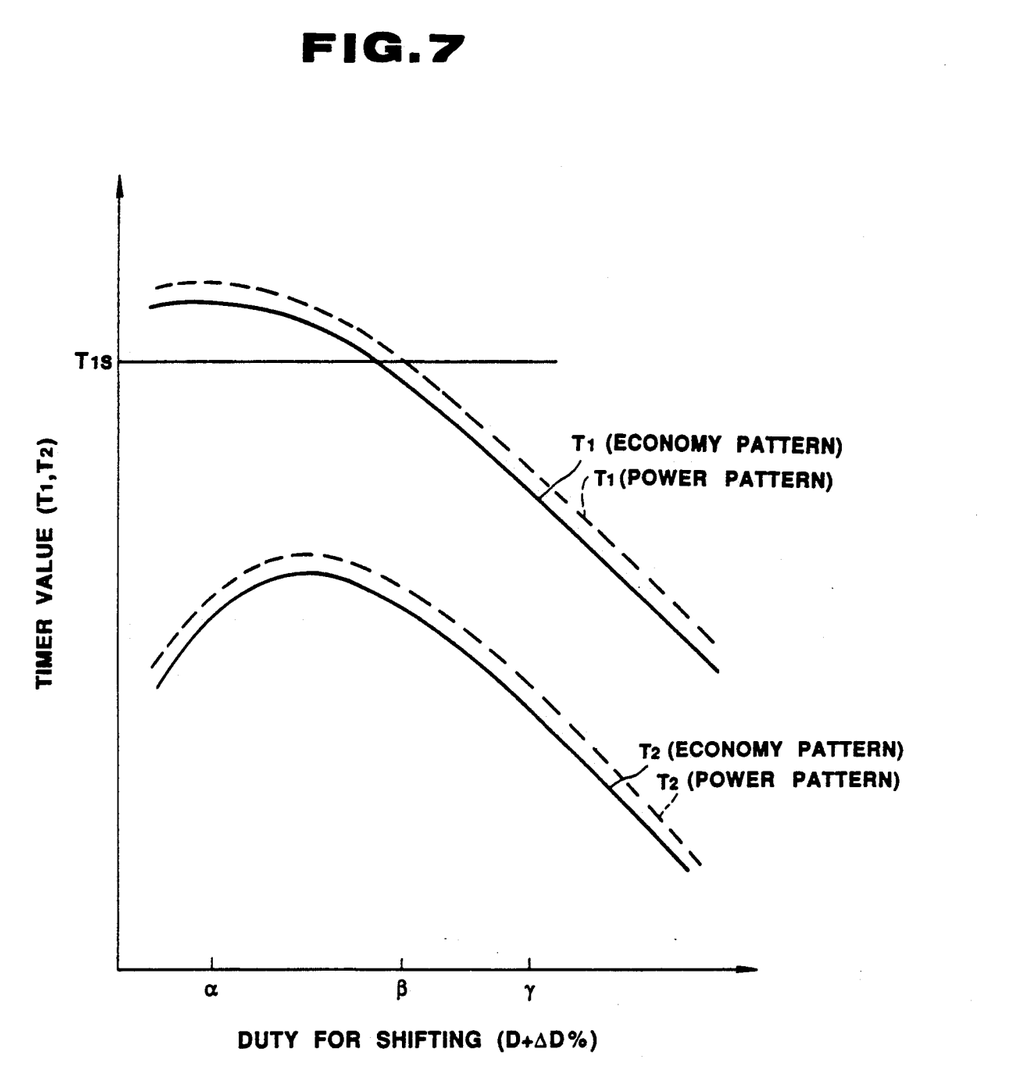
Figure 8:
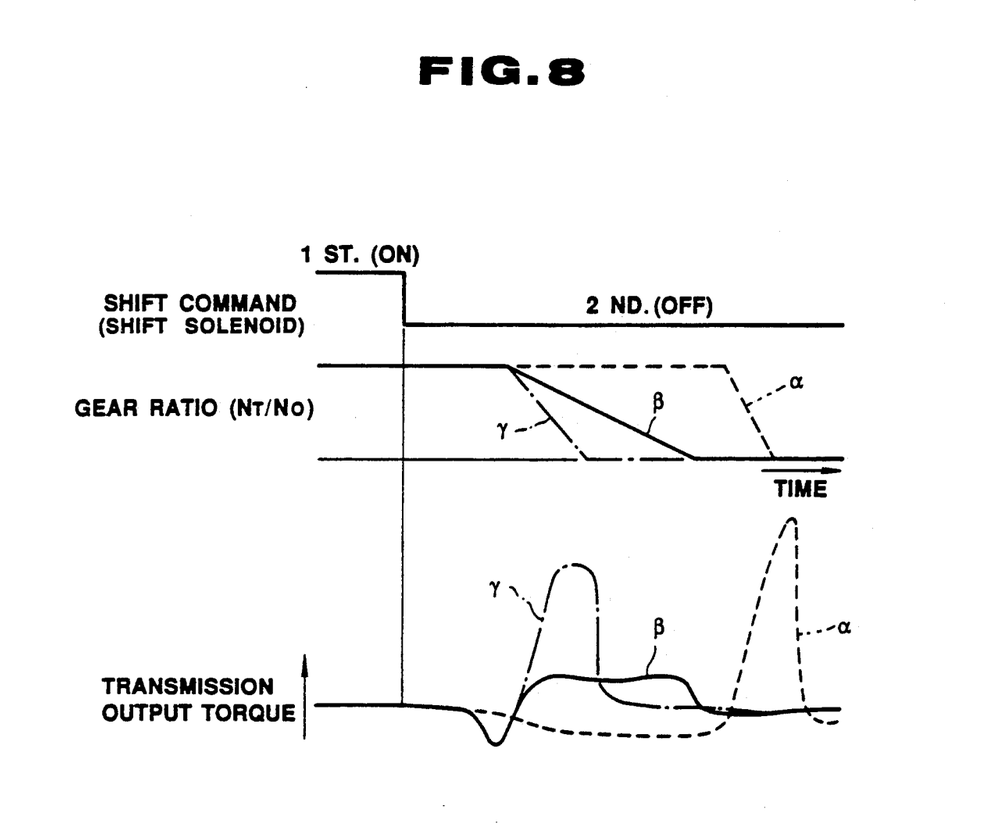
FIG. 8 are time charts illustrating operation diagrams of a 1-2 upshifting operation when the line pressure with different magnitudes as expressed by different values of duty D$\alpha$ (alpha), $\beta$ (beta), and $\gamma$ (gamma) are used.

FIG. 7 shows how the total length of time $T_1$ and the inertia phase time $T_2$ vary against various value of duty during a power-on 1-2 upshifting operation induced in accordance with the "economy pattern" (drawn by fully drawn curves) and during a power-on 1-2 upshifting induced in accordance with the "power pattern" (drawn by broken curves). Referring to FIG. 7, if the value of duty is α (alpha), for example, the magnitude of line pressure corresponding to this duty value is excessively low, causing a 1-2 upshift as illustrated by broken curves α (alpha) in FIG. 8, revealing the total shifting time $T_1$ greater than the predetermined value $T_{1S}$. As readily seen from FIG. 8, the transmission output torque shows a great peak near the completion of the shifting operation, inducing great shift shocks. In order to avoid the occurrence of this situation, if it is decided at the step 62 that $T_1 \geq T_{1S}$, the program proceeds to a step 63 where a table look-up operation of duty correction value data shown in FIG. 6 is conducted to determine a correction value ΔD (delta D) for the throttle opening degree TH. Then, the program proceeds to a step 64 where the duty value ΔD (delta D) is increased by 2 (%) and to a step 65 where ΔD is replaced with a new correction value ΔD obtained at the step 64. Since with this increased correction value ΔD the same shifting operation is conducted next time, the total shifting time $T_1$ for this shifting operation is quickly decreased and soon becomes less than $T_{1S}$. Referring back to FIG. 8, one-dot chain curves γ (gamma) illustrates a power-on 1-2 upshifting operation when the duty is γ (gamma) in FIG. 7 and thus the magnitude of line pressure is excessively high. Fully drawn curves β (beta) illustrate a power-on 1-2 upshifting operation when the duty is β (beta) in FIG. 7.

Referring back to FIG. 4, if $T_1 < T_{1S}$ holds, the program proceeds from the step 62 to a step 66 where a table look-up operation of an inertia phase time target value data table stored in the RAM is conducted to retrieve an inertia phase time target value $T_{2S}$ for the throttle opening degree TH. Then, at a step 67, a table look-up operation of the correction value data shown in FIG. 6 is conducted to retrieve a duty correction value ΔD for the throttle opening degree TH. The inertia phase time $T_2$ is compared with the inertia phase time target value $T_{2S}$ at a step 68.

If the inertia phase time $T_2$ is equal to the target value $T_{2S}$, the duty correction value data stored in the RAM and shown in FIG. 6 are not modified. Thus, the correction value stored in RAM data for the throttle opening degree TH is used in the line pressure control during the next occurrence of the same shifting operation at the same throttle opening degree TH.

If, at the step 68, it is decided that the inertia phase time $T_2$ is greater than the target value $T_{2S}$ obtained at the step 66 and thus the line pressure is relatively low, the program proceeds from the step 68 to a step 69 where the correction value ΔD (delta D) in the RAM data is increased by 0.2 (%), and then to a step 70 where the correction value ΔD for the throttle opening degree TH in the RAM data is replaced with a new correction value ΔD obtained at the step 69. Thus, the magnitude of line pressure during the next occurrence of the same shifting operation with the same throttle opening degree TH will be increased in accordance with this increase in the correction value of duty.

If, at the step 68, the inertia phase time $T_2$ is less than the target value $T_{2S}$, the program proceeds from the step 68 to a step 71 where the correction value ΔD (delta D) is decreased by 0.2 (%), and then to the step 70 where the correction value ΔD for the throttle opening degree in the RAM date is replaced with a new correction value ΔD obtained at the step 71. Therefore, the magnitude of line pressure for the same shifting operation with the same throttle opening degree TH will be decreased in accordance with this decrease in the correction value ΔD of duty.

At the step 60, if it is decided that the flag FLAG3 is equal to 1, the program proceeds to a step 72 where the flag FLAG3 is reset to 0 (zero) and ends. The fact that FLAG3=1 indicates that the inertia phase time $T_2$ measured is not suitable for the learning since the previous shifting operation is induced in accordance with the "power pattern" or the selection of the manual range by the select lever. Thus, the learning control is not conducted in this case.

After executing the program shown in FIG. 4, the control returns to a step 54 shown in FIG. 3. At the step 54, the flag FLAG2 is reset to 0 (zero), and the timers $T_1$ and $T_2$ are reset to 0 (zero), respectively.

In the previously described embodiment, the inertia phase time target values stored in the RAM data are determined taking into account power-on upshift points determined in accordance with the "economy pattern." Thus, the inertia phase time $T_2$ measured during a shifting operation of an upshift taking place in accordance with the "power pattern" or selection of the manual range by the select lever is not used for modifying the correction values in the RAM data.

Preferably, the flag FLAG3 should be set equal to 1 also when the throttle valve is substantially closed during a shifting operation since the inertia phase time target value for this power-off shifting operation is shorter than the inertia phase time target value for the power-on shifting operation of the same kind. To accomplish this end, what is necessary is to check the output signal $I_S$ of the idle switch 21 before setting the flag FLAG3.

Figure 9:
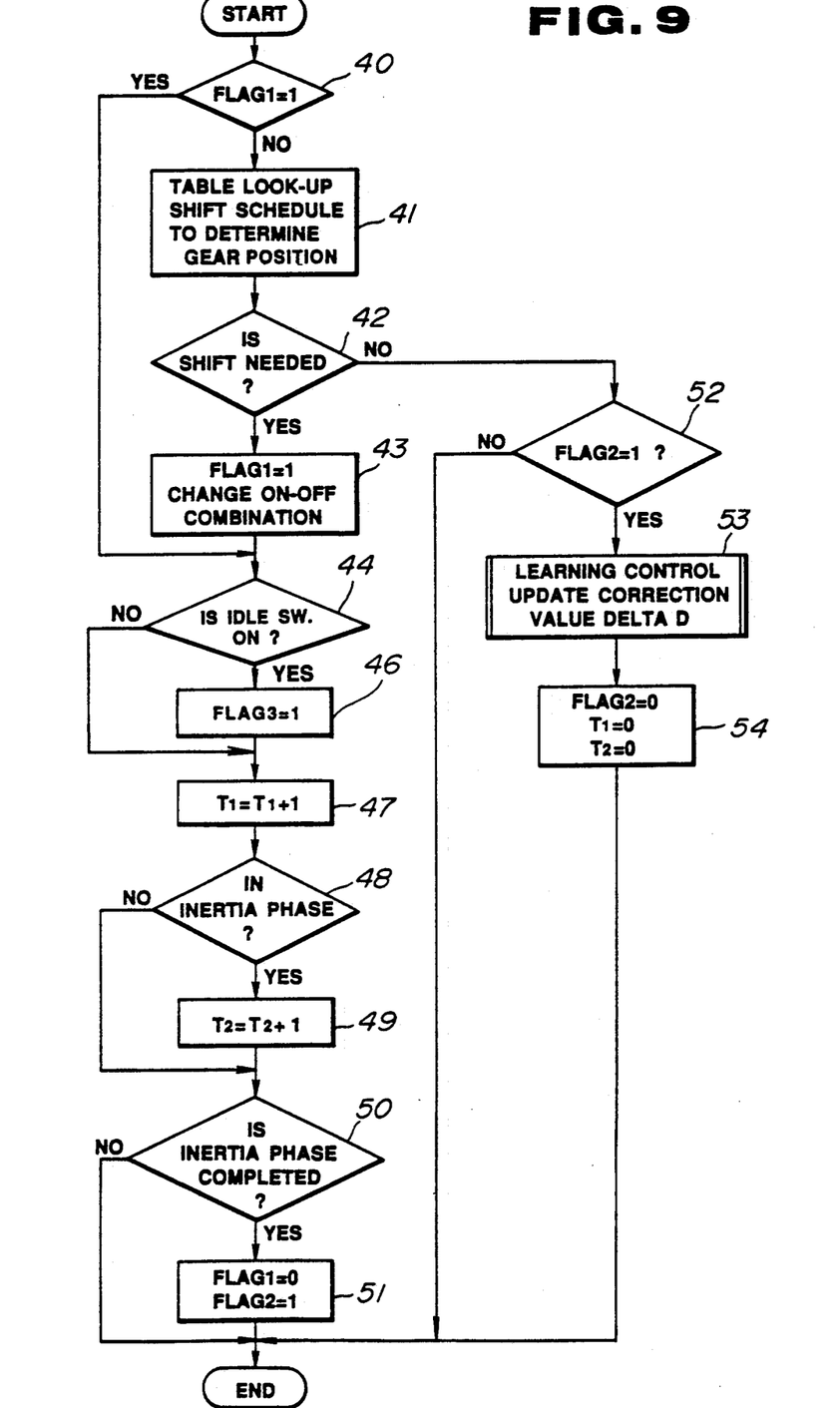
FIG. 9 is a flowchart similar to FIG. 3 showing another feature of the present invention.

FIG. 9 is a flowchart, similar to the flowchart shown in FIG. 3, illustrating another feature of the present invention. This flowchart is substantially the same as that shown in FIG. 3 except that a step 44A is provided instead of the steps 44 and 45. At the step 44A, it is decided whether the idle switch 21 is ON or OFF in order to determine whether the shifting operation proceeds with engine power off or with engine power on. If the power-off shifting operation proceeds, the program proceeds from the step 44A to a step 46 where the flag FLAG3 is set equal to 1, while if the power-on shifting operation proceeds, the program proceeds to a step 47 bypassing the above-mentioned step 46. It will now be understood that the inertia phase time $T_2$ measured during the power-off shifting operation is not relied upon for learning and thus is not used for learning to correct the correction value data table stored in the RAM. This feature of the present invention may be used in combination with the previously described feature in connection with FIG. 3. Of course, this feature illustrated by the flowchart shown in FIG. 9 may be used alone if the automatic transmission is not provided with the "power pattern" or the difference between the "economy pattern" and the "power pattern" in terms of the inertia phase time is negligible.

Figure 10:
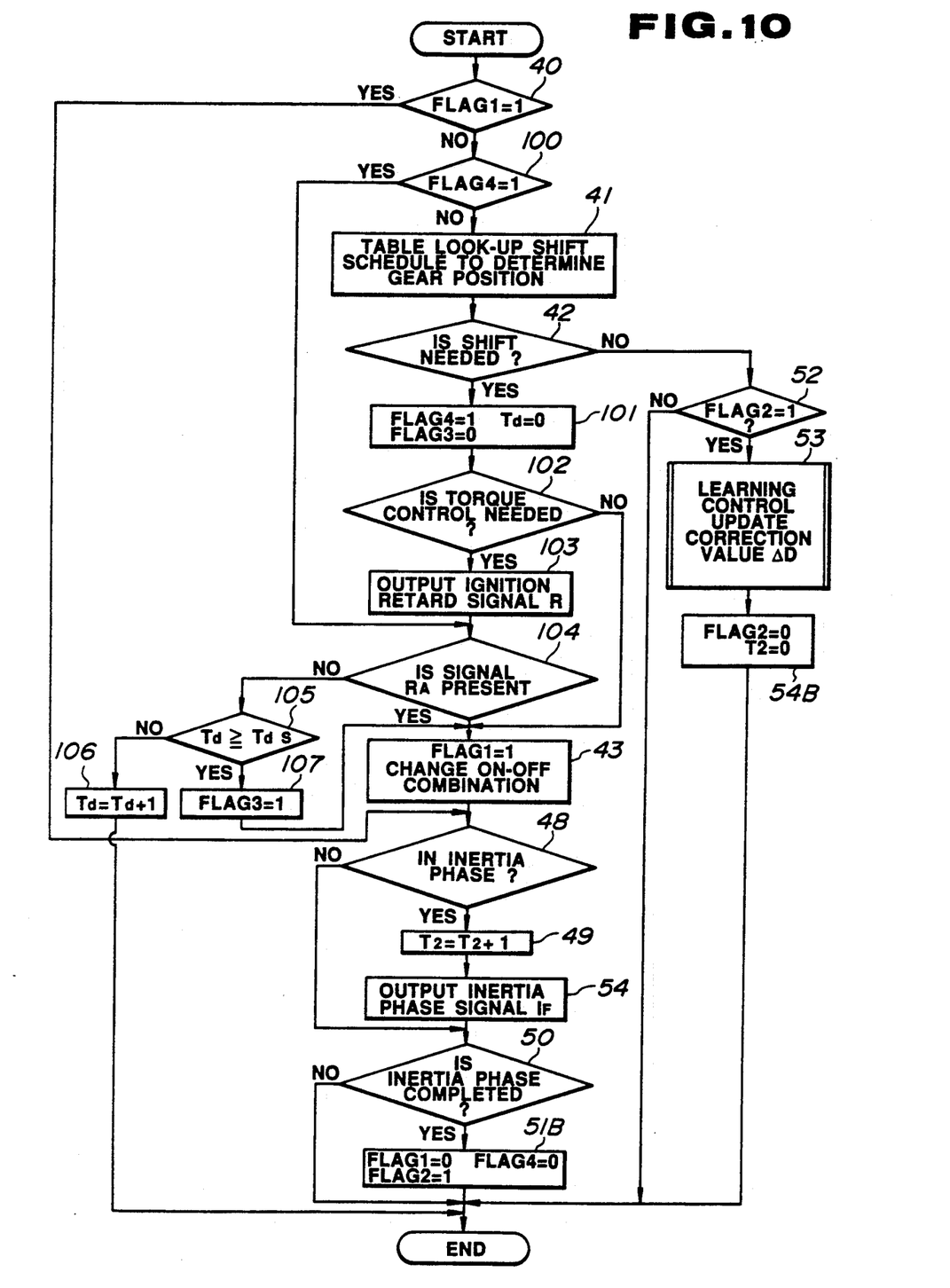
FIG. 10 is a flowchart similar to FIG. 3 showing still another feature of the present invention.

FIG. 10 is a flowchart, similar to the flowchart shown in FIG. 3, illustrating still another feature of the present invention. This flowchart is substantially the same as that shown in FIG. 3 except that a step 100 is disposed between the steps 40 and 41, and steps 101, 102, 103, 104, 105, 106, and 107 are disposed between the steps 42 and 43, and there are no counterparts to the steps 44, 45, 46 and 47 required in the flowchart shown in FIG. 3.

Referring to FIG. 10, if it is decided at step 40 that the flag FLAG1 is equal to 0, the program proceeds to step 100 where it is decided whether a skip flag FLAG4 is equal to 1 or not. If FLAG4=0, the program proceeds to step 41 and then to step 42. If it is decided at step 42 that a shift in gear position is needed, the program proceeds to step 101 where the above-mentioned skip flag FLAG4 is set equal to 1, a delay timer $T_d$ is cleared and the flag FLAG3 is reset to 0 (zero). Then, at step 102 it is decided whether the engine torque control is needed for the shift required. For example, the engine torque down is required for power-on upshifting operation.

Thus, if the shift required is of the power-on upshift, the program proceeds to step 103 where a torque-down command signal R is output and transmitted from the transmission control computer 14 to the engine control computer 5 (see FIG. 1). This torque-down command signal R urges the engine control computer 5 to retard the spark timing. If the shift required is not of the power-on upshift, the program proceeds from the step 102 directly to the step 43 bypassing steps 103 and 104.

Upon receiving the torque-down command signal R, the engine control computer 5 checks coolant temperature $T_W$ and battery voltage and outputs an affirmative signal $R_A$ when the coolant temperature $T_W$ and the battery voltage are sufficiently high so that even if the spark timing is retarded in accordance with the torque-down command signal R, the engine will not stall. This affirmative signal $R_A$ is delivered to the transmission control computer 14.

Thus, at step 104, it is decided whether the affirmative signal $R_A$ is present or not. If the affirmative signal $R_A$ is present, the program proceeds from the step 104 to step 43 where flag FLAG1 is set equal to 1 and ON-OFF combination of the shift solenoids 15a and 15b are changed to a new one corresponding to the new gear position determined at step 41. Then, the program proceeds to steps 48, 49, 110, 50, and 51B where the timer $T_2$ is incremented to measure the inertia phase time, an inertia phase signal $I_F$ is outputted and delivered to the engine control computer 5 during the inertia phase, and flags FLAG1 and FLAG4 are reset to 0, while flag FLAG2 is set equal to 1. The engine control computer 5 retards the spark timing during a period of time when the inertia phase signal $I_F$ is present under the condition where the affirmative signal $R_A$ is present. In this case, the torque-down is conducted in timed relation with the shifting operation, the inertia phase time $T_2$ measured during this shifting operation is used in the sub-program shown in FIG. 11.

If, at the step 104, it is decided that the affirmative signal $R_A$ is not present, the program proceeds to step 105 and then to step 106. At the step 106, the delay timer $T_d$ is incremented. If the affirmative signal $R_A$ is not yet outputted by the engine control computer when the delay timer $T_d$ has become greater than or equal to a predetermined delay $T_{dS}$, the flag FLAG3 is set equal to 1 at step 107. Then, the program proceeds to the step 43. From the preceding description, it will now be understood that the flag FLAG3=1 holds when engine torque control commanded is not carried out during the power-on shifting operation where such engine torque control is expected. In this case, the inertia phase time $T_2$ measured during the shifting operation is not used in the sub-program shown in FIG. 11.

Since after completion of the shifting operation FLAG1=0, FLAG2=1, FLAG4=0 hold, the program proceeds along steps 40, 100, 41, 42, 52 to step 53. At the step 53, the execution of the sub-program shown in FIG. 11 is initiated.

Figure 11:
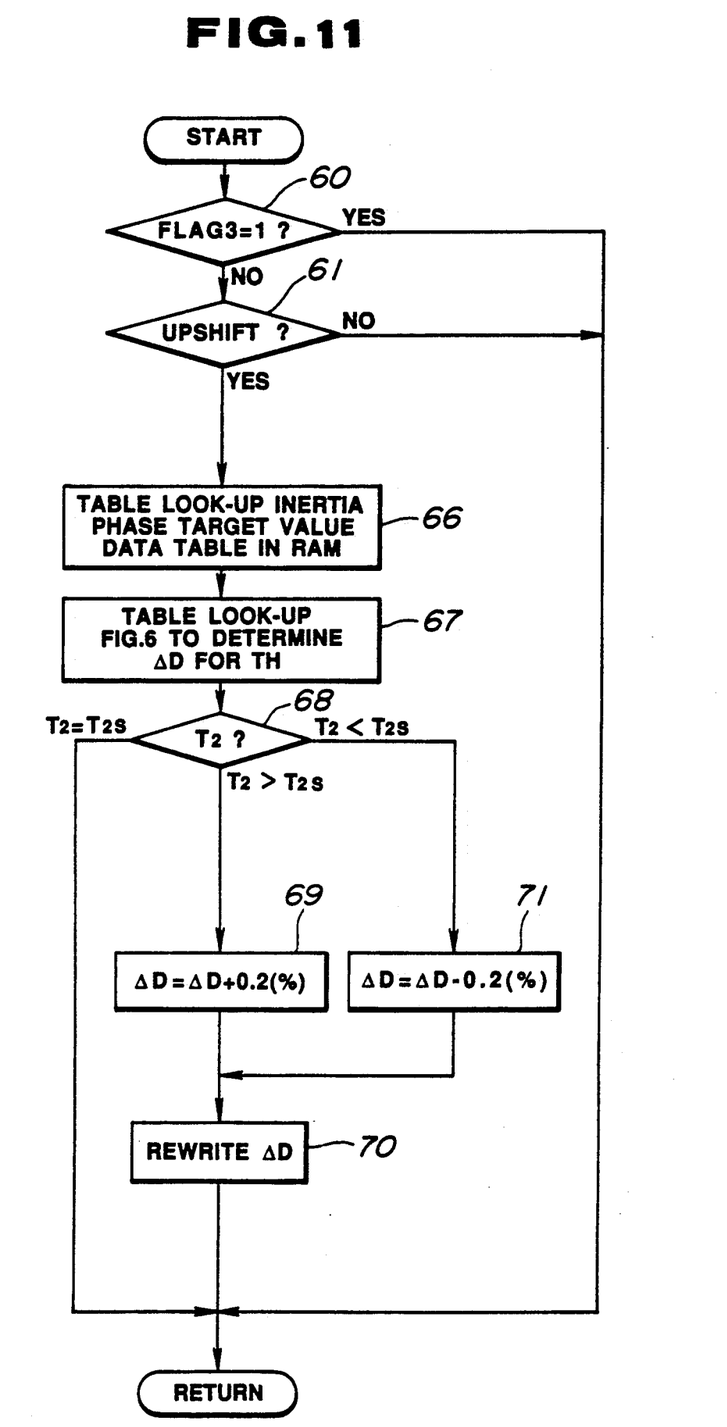
FIG. 11 is a flowchart similar to FIG. 4 showing a sub-program which is to be put into execution in the flowchart shown in FIG. 10.

Referring to FIG. 11, if the flag FLAG3 is not equal to 1 (FLAG3=0), the program proceeds along steps 61, 66, 67, 68, 69 (or 71), and 70 to effect learning to rewrite or updating ΔD (delta D) in the RAM (see FIG. 6). However, if the flag FLAG3 is set equal to 1, these steps are bypassed and the learning to rewrite or updating ΔD (delta D) is not carried out.

After executing the sub-program shown in FIG. 11, the control returns to step 54B shown in FIG. 10 where the flag FLAG2 is reset to 0 (zero) and the inertia phase timer $T_2$ is cleared.

The last-mentioned feature of the present invention may be used together with at least one of the features of the present invention previously described. Of course, it may be used alone.

Regarding the difference in the inertia phase time between the case where an upshifting operation is accompanied by the engine torque-down and the case where the same upshifting operation is not accompanied by the engine torque-down, with the same throttle opening degree, the inertia phase time in the former case is shorter than that in the latter case. Thus, if the inertia phase time period obtained in the latter case were used in the learning operation, the line pressure would be increased excessively.

What is claimed is:

1. A line pressure control system for an automatic transmission when the automatic transmission undergoes a shifting operation where the line pressure is used to activate a friction element, the line pressure control system, comprising:

means for storing a target value of a predetermined variable that is representative of a quality of the shifting operation occurring under predetermined circumstances;

means for determining an actual value of said predetermined variable for the shifting operation after occurrence of the shifting operation and generating an actual value indicative signal indicative of said actual value determined;

means for detecting circumstances surrounding said occurrence of the shifting operation;

means for comparing said circumstances detected with said predetermined circumstances and generating a deviation indicative signal when a deviation therebetween fails to fall in a predetermined range;

means for comparing said actual value indicative signal with said target value when said deviation indicative signal is absent and generating a comparison result signal indicative of a difference between said actual value measured and said target value; and means for adjusting the magnitude of the line pressure in response to said comparison result indicative signal during the next occurrence of the shifting operation in such a direction as to decrease said difference indicated by said comparison result indicative signal, whereby the friction element is activated by the line pressure adjusted during the next occurrence of the shifting operation.

2. A line pressure control system as claimed in claim 1, wherein said circumstances detecting means include means for detecting which of a plurality of shift patterns is in use in inducing the shifting operation, and means for generating an output signal indicative of which of a plurality of range positions a select lever is placed at.

3. A line pressure control system as claimed in claim 1, wherein said circumstances detecting means include an idle switch which takes a predetermined status when a throttle valve of an engine which the automatic transmission is drivingly connected to is substantially closed.

4. A line pressure control system as claimed in claim 1, wherein said circumstances detecting means include means for generating an affirmative signal when an engine which the automatic transmission is drivingly connected to is ready to carry out a torque-down control.

5. A line pressure control system as claimed in claim 1, wherein said target value storing means includes a random access memory.

6. A line pressure control system as claimed in claim 1, wherein said predetermined variable is an inertia phase time during which a gear ratio in the automatic transmission undergoes variation.

7. A line pressure control system as claimed in claim 2, wherein said circumstances detecting means include means for detecting a throttle opening degree of a throttle valve of an engine which the automatic transmission is drivingly connected to.

8. A line pressure control system as claimed in claim 3, wherein said circumstances detecting means include means for detecting a throttle opening degree of a throttle valve of the engine.

9. A line pressure control system as claimed in claim 4, wherein said circumstances detecting means include means for detecting a throttle opening degree of a throttle valve of the engine.

10. A line pressure control method for an automatic transmission when the automatic transmission undergoes a shifting operation where the line pressure is used to activate a friction element, the line pressure control method comprising the steps of:
   setting a target value of a predetermined variable that is representative of a quality of the shifting operation occurring under predetermined circumstances;
   determining an actual value of said predetermined variable for the shifting operation after occurrence of the shifting operation and generating an actual value indicative signal indicative of said actual value determined;
   detecting circumstances surrounding said occurrence of the shifting operation;
   comparing said circumstances detected with said predetermined circumstances and generating a deviation indicative signal when a deviation therebetween fails to fall in a predetermined range;
   comparing said actual value indicative signal with said target value when said deviation indicative signal is absent and generating a comparison result signal indicative of a difference between said actual value measured and said target value; and
   adjusting the magnitude of the line pressure in response to said comparison result indicative signal during the next occurrence of the shifting operation in such a direction as to decrease said difference indicated by said comparison result indicative signal, whereby the friction element is activated by the line pressure adjusted during the next occurrence of the shifting operation.

11. A method of controlling a line pressure for an automatic transmission including a transmission input member and a transmission output member, the automatic transmission being shiftable between a first gear ratio and a second gear ratio and including a friction device which is engaged in response to a magnitude of a line pressure to effect a shifting operation between the first and second gear ratios, the method comprising the steps of:
   detecting a revolution speed of the transmission input member and generating a first output signal indicative of said revolution speed of the transmission input member detected;
   detecting a revolution speed of the transmission output member and generating a second output signal indicative of said revolution speed of the transmission output member detected;
   determining responsive to said first and second output signals an actual gear ratio of said revolution speed of the transmission input member to said revolution speed of the transmission output member;
   setting a predetermined range for the shifting operation as determined in view of the first and second gear ratios;
   repeatedly checking whether or not said actual gear ratio determined falls in said predetermined range and incrementing a timer when said actual gear ratio falls in said predetermined range, whereby the content of said timer after completion of the shifting operation is representative of a quality of the shifting operation;
   determining whether or not the shifting operation has been effected under predetermined circumstances;
   comparing the content of said timer after completion of the shifting operation with a target value when it is determined that the shifting operation just completed has been effected under said predetermined circumstances; and
   adjusting the magnitude of the line pressure which engages the friction device during the next occurrence of the shifting operation in response to a result from comparing the content of said timer with said target value.

12. A method of controlling a line pressure for an automatic transmission including a transmission input member and a transmission output member, the automatic transmission being shiftable between a first gear ratio and a second gear ratio in accordance with a first shift point map and also in accordance with a second shift point map, and including a friction device which is engaged in response to a magnitude of a line pressure to effect a shifting operation between the first and second gear ratios, the method comprising the steps of:
   detecting a revolution speed of the transmission input member and generating a first output signal indicative of said revolution speed of the transmission input member detected;
   detecting a revolution speed of the transmission output member and generating a second output signal indicative of said revolution speed of the transmission output member detected;
   determining responsive to said first and second output signals an actual gear ratio of said revolution speed of the transmission input member to said revolution speed of the transmission output member;
   setting a predetermined range for the shifting operation as determined in view of the first and second gear ratios;
   repeatedly checking whether or not said actual gear ratio determined falls in said predetermined range and incrementing a timer when said actual gear ratio falls in said predetermined range, whereby the content of said timer after completion of the shifting operation is representative of a quality of the shifting operation;
   determining whether the shifting operation has been effected in accordance with the first shift point map or the second shift point map;
   comparing the content of said timer after completion of the shifting operation with a target value when it is determined that the shifting operation just completed has been effected in accordance with the first shift point map; and adjusting the magnitude of the line pressure which engages the friction device during the next occurrence of the shifting operation in response to a result from comparing the content of said timer with said target value.

13. A method of controlling a line pressure for an automatic transmission drivingly connected to an engine, the automatic transmission including a transmission input member and a transmission output member, the automatic transmission being shiftable between a first gear ratio and a second gear ratio and including a friction device which is engaged in response to a magnitude of a line pressure to effect a shifting operation between the first and second gear ratios, the method comprising the steps of:

detecting a revolution speed of the transmission input member and generating a first output signal indicative of said revolution speed of the transmission input member detected;

detecting a revolution speed of the transmission output member and generating a second output signal indicative of said revolution speed of the transmission output member detected;

determining responsive to said first and second output signals an actual gear ratio of said revolution speed of the transmission input member to said revolution speed of the transmission output member;

setting a predetermined range for the shifting operation as determined in view of the first and second gear ratios;

repeatedly checking whether or not said actual gear ratio determined falls in said predetermined range and incrementing a timer when said actual gear ratio falls in said predetermined range, whereby the content of said timer after completion of the shifting operation is representative of a quality of the shifting operation;

determining whether or not the shifting operation has been effected during operation of the engine with load;

comparing the content of said timer after completion of the shifting operation with a target value when it is determined that the shifting operation just completed has been effected during operation of the engine with load; and adjusting the magnitude of the line pressure which engages the friction device during the next occurrence of the shifting operation in response to a result from comparing the content of said timer with said target value.

14. A method of controlling a line pressure for an automatic transmission drivingly connected to an engine which can carry out a torque down-control, the automatic transmission including a transmission input member and a transmission output member, the automatic transmission being shiftable between a first gear ratio and a second gear ratio and including a friction device which is engaged in response to a magnitude of a line pressure to effect a shifting operation between the first and second gear ratios, the method comprising the steps of:

detecting a revolution speed of the transmission input member and generating a first output signal indicative of said revolution speed of the transmission input member detected.

detecting a revolution speed of the transmission output member and generating a second output signal indicative of said revolution speed of the transmission output member detected;

determining responsive to said first and second output signals an actual gear ratio of said revolution speed of the transmission input member to said revolution speed of the transmission output member;

setting a predetermined range for the shifting operation as determined in view of the first and second gear ratios;

repeatedly checking whether or not said actual gear ratio determined falls in said predetermined range and incrementing a timer when said actual gear ratio falls in said predetermined range, whereby the content of said timer after completion of the shifting operation is representative of a quality of the shifting operation;

determining whether or not the shifting operation has been effected during operation of the engine under the torque-down control;

comparing the content of said timer after completion of the shifting operation with a target value when it is determined that the shifting operation just completed has been effected during operation of the engine under the torque-down control; and adjusting the magnitude of the line pressure which engages the friction device during the next occurrence of the shifting operation in response to a result from comparing the content of said timer with said target value.

* * * * *